United States Patent
Murayama et al.

(10) Patent No.: US 8,624,126 B2
(45) Date of Patent: Jan. 7, 2014

(54) PORTABLE DEVICE

(75) Inventors: Kazunori Murayama, Kawasaki (JP);
Manabu Takase, Kawasaki (JP);
Shigeru Yamaguchi, Kawasaki (JP);
Jiro Takahashi, Kawasaki (JP); Hiroshi Kobayashi, Kawasaki (JP); Takahiro Nakamura, Kawasaki (JP); Ken Shoji, Kawasaki (JP); Daisuke Tsukahara, Kawasaki (JP); Tsukasa Goro, Kawasaki (JP); Yoshitaka Sakata, Kawasaki (JP); Yoshihiro Hirabayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 12/946,912

(22) Filed: Nov. 16, 2010

(65) Prior Publication Data
US 2011/0115744 A1   May 19, 2011

(30) Foreign Application Priority Data

Nov. 17, 2009   (JP) .................................. 2009-262355

(51) Int. Cl.
*H05K 1/09* (2006.01)
(52) U.S. Cl.
USPC .......................................... 174/257; 361/736
(58) Field of Classification Search
USPC ............ 174/257; 345/173; 361/728, 736, 739, 361/748, 796
See application file for complete search history.

(56) References Cited

U.S. PATENT DOCUMENTS

2009/0033634 A1   2/2009   Shih et al.
2010/0090975 A1*  4/2010   Nagata et al. ................. 345/174

FOREIGN PATENT DOCUMENTS

| JP | 9-115378    | 5/1997 |
| JP | 2006-4215   | 1/2006 |
| JP | 2008-21304  | 1/2008 |
| JP | 2008-181366 | 8/2008 |
| JP | 2009-38796  | 2/2009 |

OTHER PUBLICATIONS

"Japanese Office Action" mailed by JPO and corresponding to Japanese Application No. 2009-262355 on Apr. 9, 2013, with partial English translation.
Japanese Office Action mailed Oct. 29, 2013 for corresponding Japanese Application No. 2009-262355, with English-language translation.

* cited by examiner

*Primary Examiner* — Jeremy Norris
*Assistant Examiner* — Tremesha S Willis
(74) *Attorney, Agent, or Firm* — Fujitsu Patent Center

(57) ABSTRACT

A portable device including: a housing including a bottom wall section and a frame-shaped peripheral wall section provided on the bottom wall section; a pressure-sensitive touch panel including a bonding section and a contact section, the bonding section being bonded to the peripheral wall section and the contact section being surrounded by the housing and positioned inside from the bonding section; and a control board that is electrically connected to the touch panel through the contact section.

8 Claims, 6 Drawing Sheets

PORTABLE DEVICE

CROSS-REFERENCE TO RELATED APPLICATIONS

This application is based upon and claims the benefit of priority of the prior Japanese Patent Application No. 2009-262355, filed on Nov. 17, 2009, the entire contents of which are incorporated herein by reference.

BACKGROUND

1. Field

The present invention relates to portable devices. In particular, the present invention relates to a portable device including a resistive film type touch panel.

2. Description of the Related Art

Portable devices including resistive film type touch panels are known. The touch panels include contact sections for providing electrical connection between the touch panels and external devices. Such a device according to the related art is disclosed in, for example, Japanese Unexamined Patent Application Publication No. 2009-38796, No. 2008-181366, and No. 9-115378.

SUMMARY

It is an aspect of the embodiments discussed herein to provide a portable device including: a housing including a bottom wall section and a frame-shaped peripheral wall section provided on the bottom wall section; a pressure-sensitive touch panel including a bonding section and a contact section, the bonding section being bonded to the peripheral wall section and the contact section being surrounded by the housing and positioned inside from the bonding section; and a control board that is electrically connected to the touch panel through the contact section.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DETAILED DESCRIPTION OF THE EMBODIMENTS

In the structure of a related art, a contact section between a touch panel and a portable device is provided at an edge of the touch panel. For example, when a flexible substrate is connected to the touch panel, the flexible substrate extends from the edge of the touch panel. The flexible substrate is connected to the touch panel at one end and to a control board in a housing at the other end. The flexible substrate extends into the housing such that a waterproof structure is provided between the flexible substrate and the housing. The waterproof structure is provided to prevent water from entering through a space between the flexible substrate and the housing. However, when such a waterproof structure is provided, the number of components of the portable device increases.

According to a portable device described below, the number of components of a waterproofed touch panel may be reduced.

Figure 1A:
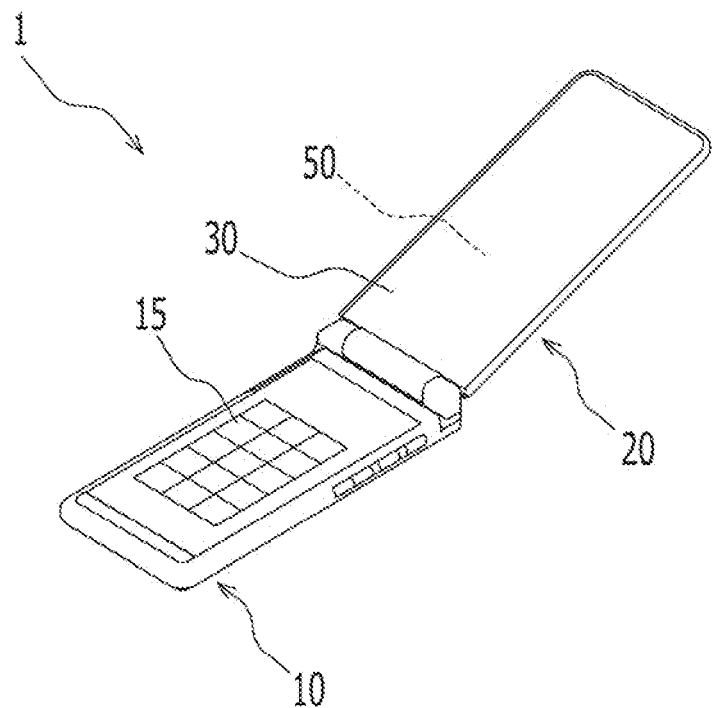
FIG. 1A illustrates a mobile phone according to an embodiment.

A mobile phone will be described as an example of a portable device. FIG. 1A illustrates a mobile phone 1 according to an embodiment. The mobile phone 1 includes a main unit 10 and a display unit 20. The main unit 10 and the display unit 20 are connected to each other in a pivotable manner by a hinge structure. Thus, the main unit 10 and the display unit 20 are connected to each other such that the mobile phone 1 may be opened and closed. Operation keys 15 for operating the mobile phone 1 are provided on the main unit 10. A touch panel 30 is provided on the display unit 20, and a display 50 is provided in the display unit 20.

Figure 1B:
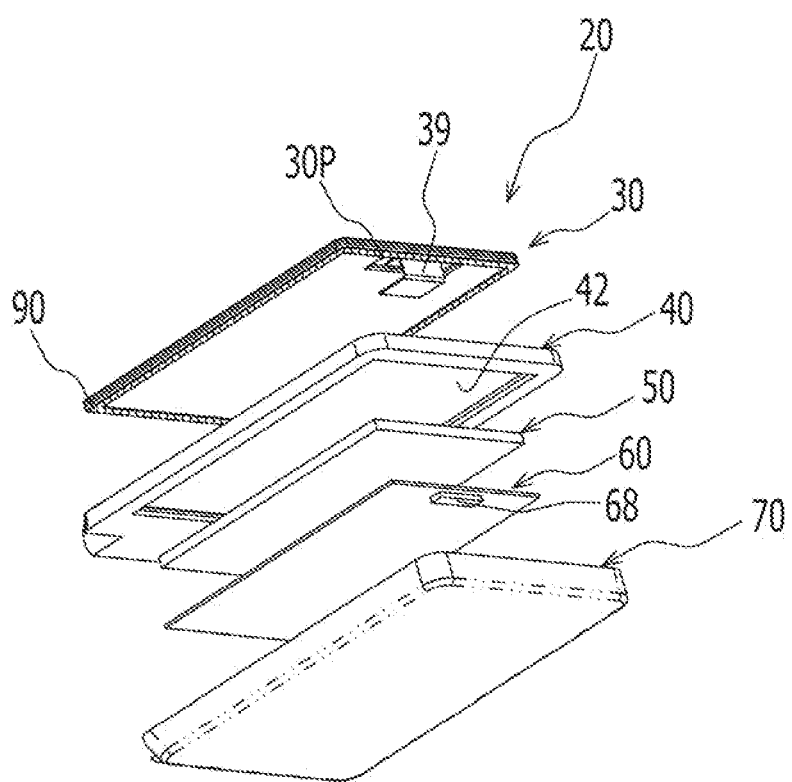
FIG. 1B is an exploded perspective view of a display unit.

FIG. 1B is an exploded perspective view of the display unit 20. The display unit 20 includes the touch panel 30, a first housing 40, the display 50, a control board 60, and a second housing 70. The touch panel 30, the first housing 40, the display 50, the control board 60, and the second housing 70 are arranged in that order from a front side to a back side of the display unit 20. The touch panel 30 is a resistive film type touch panel. A flexible substrate 39 is connected to the touch panel 30. A cut section 30P is formed in the touch panel 30 at an area around the flexible substrate 39.

The first housing 40 is approximately rectangular frame shaped. The first housing 40 has a approximately rectangular opening 42. The display 50 displays a certain image in response to an operation of the operation keys 15 or the touch panel 30. The display 50 corresponds to a display panel. The display 50 is mounted on the control board 60. A connector 68 to which the flexible substrate 39 is coupled is provided on a back side of the control board 60. The control board 60 is electrically coupled to the touch panel 30 through the flexible substrate 39.

A central processing unit (CPU), a read only memory (ROM), a random access memory (RAM), etc., which are not illustrated in the drawing, are also mounted on the control board 60. The control board 60 has a function of detecting a position where the touch panel 30 is touched in accordance with an output from the touch panel 30. The control board 60 corresponds to an electronic component that is electrically connected to the touch panel 30.

Figure 2:
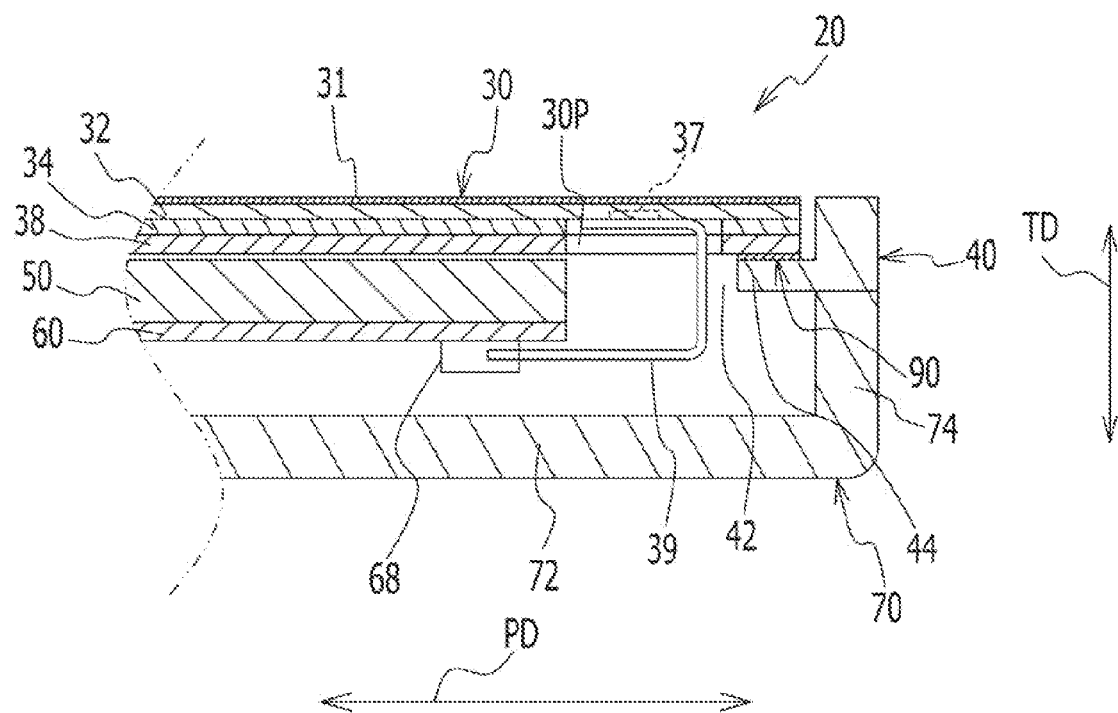
FIG. 2 is a sectional view of the display unit.

FIG. 2 is a sectional view of the display unit 20. As illustrated in FIG. 2, the touch panel 30 includes a design sheet 31, a first sensor 32, a second sensor 34, and a reinforcing plate 38. The design sheet 31 is located on a front side of the touch panel 30. The design sheet 31 is flexible and is made of synthetic resin. The design sheet 31 is bonded to a front surface of the first sensor 32. The design sheet 31 has a function of protecting the first sensor 32. The design sheet 31 is optically transparent.

Each of the first sensor 32 and the second sensor 34 includes a conductive film, which will be described in detail below. The reinforcing plate 38 is located on a back surface of the second sensor 34. The reinforcing plate 38 is made of synthetic resin.

The second housing 70 includes a bottom wall section 72 and a peripheral wall section 74 provided on the bottom wall section 72. The first housing 40 is bonded to a top surface of the peripheral wall section 74. The first housing 40 includes a peripheral wall section 44 that projects inward. The first housing 40 and the second housing 70 are made of synthetic resin. The first housing 40 and the second housing 70 function as a housing of the display unit 20.

The touch panel 30 is bonded to the peripheral wall section 44 with a piece of double-sided adhesive tape 90. The double-sided adhesive tape 90 has waterproof properties. The double-sided adhesive tape 90 corresponds to a waterproof member that prevents water from flowing into the display unit 20. As illustrated in FIG. 1B, the double-sided adhesive tape 90 is applied to a back surface of the touch panel 30 along the peripheral edge. The touch panel 30 is bonded to the first housing 40 so as to cover the opening 42. The peripheral edge section of the back surface of the touch panel 30 corresponds to a bonding section of the touch panel 30 that is bonded to the first housing 40. More specifically, a peripheral edge section of a back surface of the reinforcing plate 38 corresponds to the bonding section.

The cut section 30P is formed in the touch panel 30. The cut section 30P is formed by partially cutting the second sensor 34 and the reinforcing plate 38. The back surface of the first sensor 32 is partially exposed at the cut section 30P. Contact sections 37 to which the flexible substrate 39 is connected to at one end are provided on the exposed section of the first sensor 32. The contact sections 37 are connected to the flexible substrate 39 by an anisotropic conductive film (ACF) connection. The contact sections 37 have a function of providing an electrical connection between the touch panel 30 and an external device. The number of the contact sections 37 will be described below.

As described above, the contact sections 37 are positioned inside the double-sided adhesive tape 90 at the back side of the touch panel 30. Therefore, the contact sections 37 and the flexible substrate 39 are surrounded by the first housing 40 and the second housing 70. Thus, a waterproof structure is provided. The display unit 20 is waterproofed by a single piece of double-sided adhesive tape 90. Therefore, there are a fewer number of waterproof members, and the number of components of the display unit 20 is reduced accordingly.

The peripheral edge section of the back surface of the touch panel 30 is bonded to the first housing 40, and a peripheral edge section of a front surface of the touch panel 30 is not covered by another component. Therefore, the front surface of the touch panel 30 has a relatively large area. Accordingly, a relatively large operating area may be provided on the front surface of the touch panel 30. For example, when a frame that covers the peripheral edge section of the front surface of the touch panel 30 is provided on the housing, the operating area of the touch panel 30 is reduced.

Figure 3:
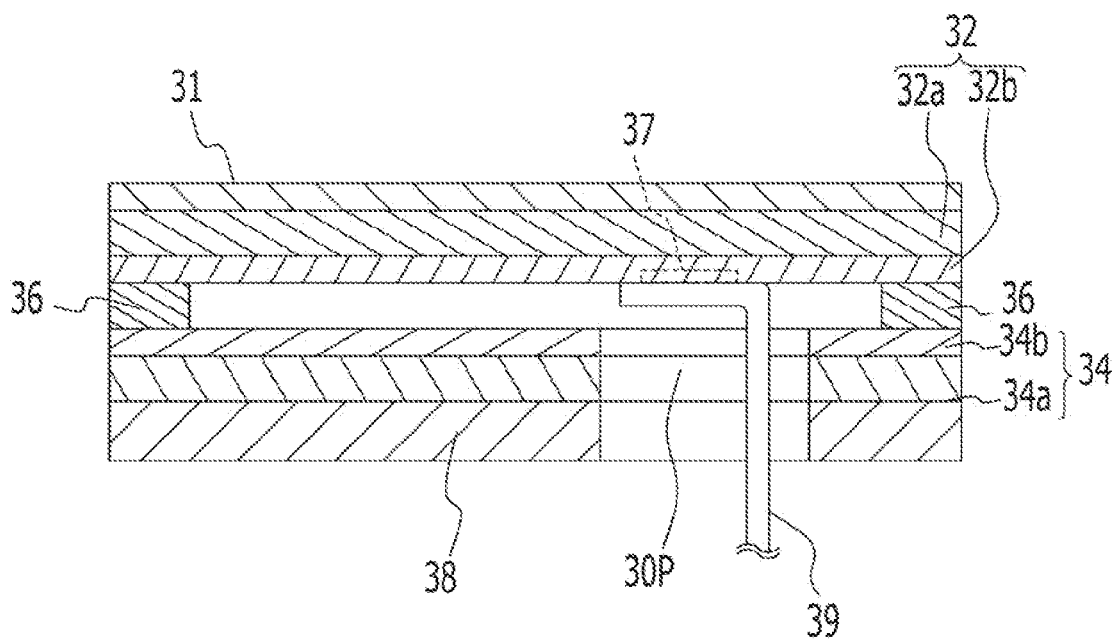
FIG. 3 illustrates the structure of a touch panel.

FIG. 3 illustrates the structure of the touch panel 30. As illustrated in FIG. 3, the first sensor 32 includes a substrate 32a and an indium tin oxide (ITO) film 32b formed on a back surface of the substrate 32a. The second sensor 34 includes a substrate 34a and an ITO film 34b formed on a front surface of the substrate 34a. The ITO films 32b and 34b correspond to a conductive film.

The substrate 32a may be a film. The film may be a polyester film, such as a polyethylene terephthalate (PET) film. The substrate 32a may also be a plastic sheet. The plastic sheet may be a sheet of polycarbonate, polycycloolefin, acrylic resin, or the like. The substrate 34a is made of glass. The substrate 34a may instead be a film or a plastic sheet.

The ITO films 32b and 34b are an example of a metal oxide film. Zinc oxide films (ZnO films), for example, may be used as the ITO films 32b and 34b. The ITO film 32b may be formed on the substrate 32a by sputtering or chemical vapor deposition (CVD).

A bonding member 36 is provided between the first sensor 32 and the second sensor 34. The bonding member 36 is interposed between a peripheral edge section of the ITO film 32b and a peripheral edge section of the ITO film 34b. The bonding member 36 is frame shaped. The bonding member 36 has a function of providing a space between the ITO films 32b and 34b such that the ITO films 32b and 34b do not come into contact with each other when the front surface of the touch panel 30 is not pressed. Thus, the ITO films 32b and 34b face each other with a space provided between the films.

Figure 4:
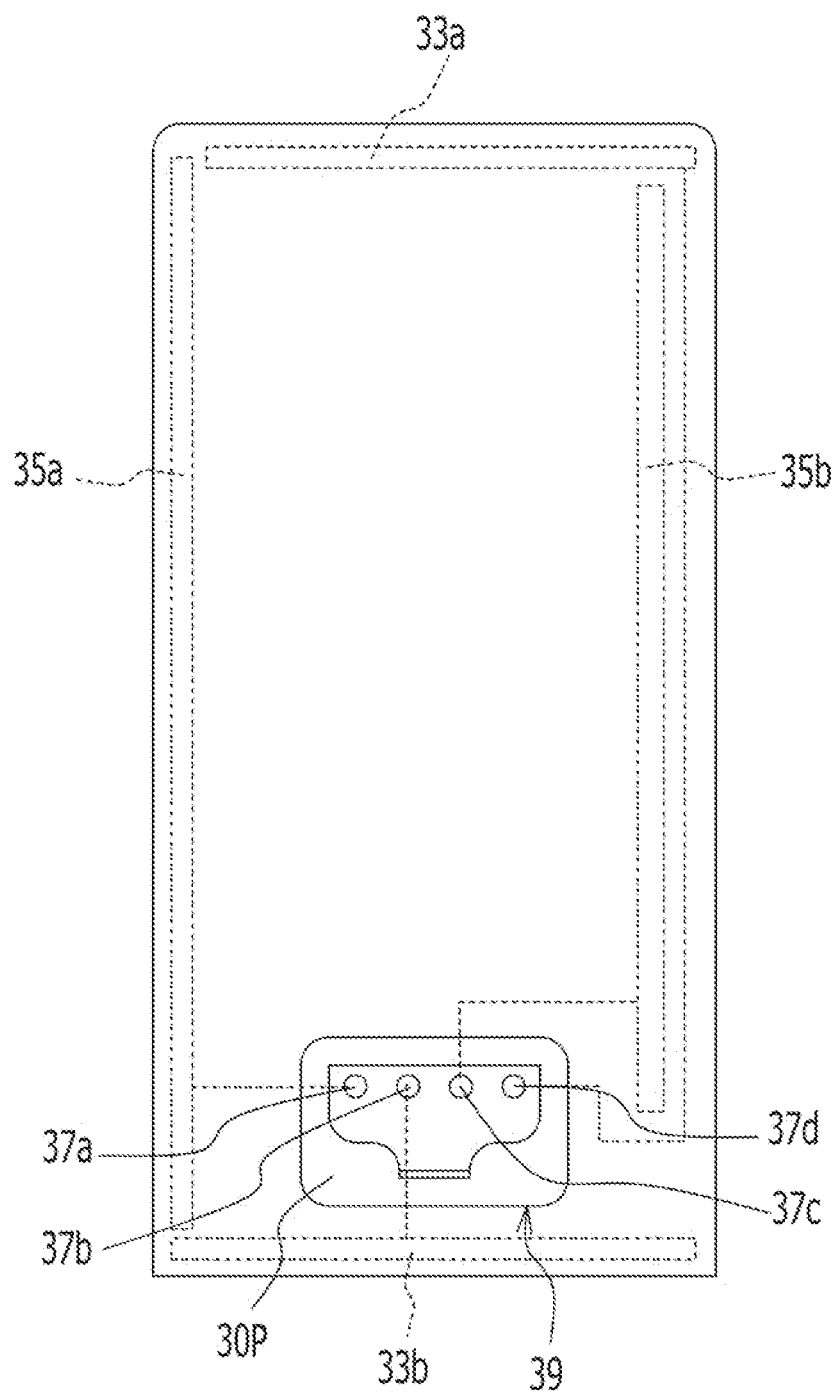
FIG. 4 is a back view of the touch panel.

FIG. 4 is a back view of the touch panel 30. As illustrated in FIG. 4, each of the ITO films 32b and 34b is provided with a pair of electrodes. The ITO film 32b is provided with a pair of electrodes 33a and 33b that face each other and that are approximately parallel to each other. The ITO film 34b is provided with a pair of electrodes 35a and 35b that face each other and that are approximately parallel to each other. The electrodes 33a and 33b are approximately parallel to the electrodes 35a and 35b. The contact sections 37 include contact sections 37a to 37d. The contact sections 37a to 37d are electrically connected to the electrodes 35a, 33b, 35b, and 33a, respectively. The electrical connections are provided by wires.

A function of the CPU mounted on the control board 60 will now be described. For example, when the touch panel 30 is pressed while a voltage is applied between the electrodes 33a and 33b, the ITO films 32b and 34b come into contact with each other. At this time, the CPU reads voltage values from the electrodes 35a and 35b and thereby detects the position in the Y-direction at which the touch panel 30 has been pressed. Similarly, when the touch panel 30 is pressed while a voltage is applied between the electrodes 35a and 35b, the CPU reads voltage values from the electrodes 33a and 33b and thereby detects the position in the X-direction at which the touch panel 30 has been pressed. The above-described method for detecting the pressing position is commonly known.

Figure 5A:
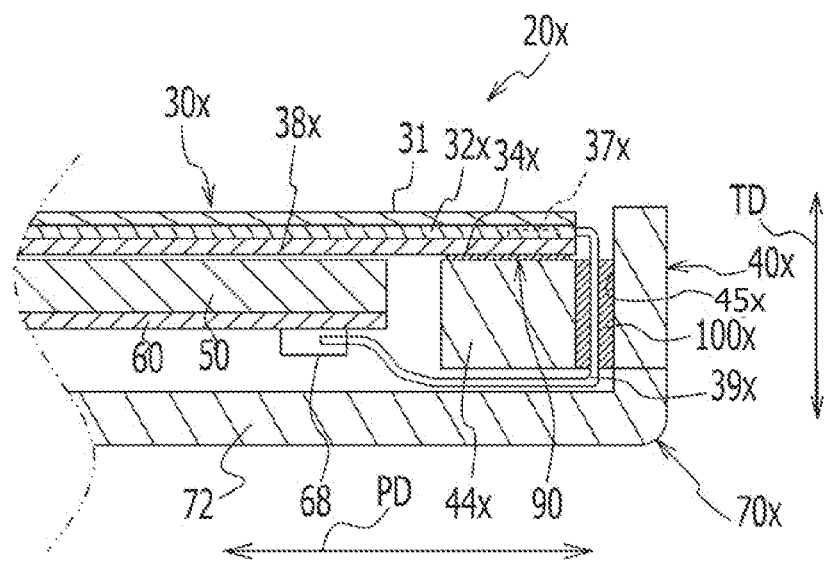
FIGS. 5A and 5B illustrate a display unit having a structure different from that of the display unit in the mobile phone according to the present embodiment.
Figure 5B:
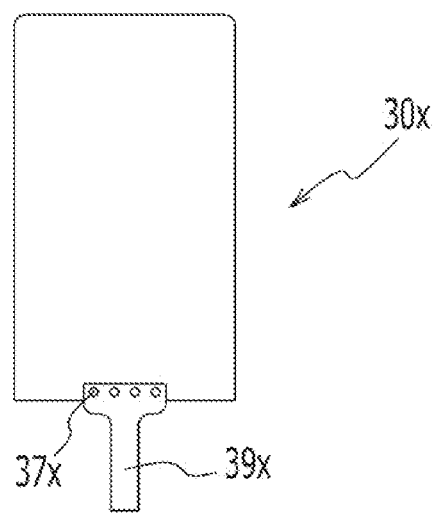

Next, a display unit 20x having a structure different from that of the display unit 20 in the mobile phone 1 according to the present embodiment will be described. FIGS. 5A and 5B illustrate the display unit 20x having a structure different from that of the display unit 20 in the mobile phone 1 according to the present embodiment. As illustrated in FIG. 5A, a flexible substrate 39x extends out from an edge of a touch panel 30x. As illustrated in FIGS. 5A and 5B, contact sections 37x are provided at an edge of the touch panel 30x. As illustrated in FIG. 5A, a peripheral edge section of a back surface of a reinforcing plate 38x is bonded to a peripheral wall section 44x of a first housing 40x with a piece of double-sided adhesive tape 90. The flexible substrate 39x extends into a housing formed by the first housing 40x and a second housing 70x through a through-hole 45x formed in the peripheral wall section 44x. The through-hole 45x extends in the direction of the thickness of the display unit 20x. A gasket 100x is provided between the inner wall of the through-hole 45x and the flexible substrate 39x. The gasket 100x is elastic. The gasket 100x prevents water from flowing into the housing formed by the first housing 40x and the second housing 70x through a gap between the inner wall of the through-hole 45x and the flexible substrate 39x.

Thus, the flexible substrate 39x extends from the edge of the touch panel 30. In other words, the contact sections 37x are provided at the edge of the touch panel 30. Therefore, the flexible substrate 39x is located so as to extend into the display unit 20x, and it is desirable to provide the gasket 100x. Thus, two waterproof members, which are the double-sided adhesive tape 90 and the gasket 100x, are provided in the display unit 20x. Accordingly, the number of components is increased.

However, in the mobile phone 1 according to the present embodiment, as illustrated in FIG. 2, providing the gasket 100x is unnecessary. Thus, it is acceptable to not provide a special additional waterproof member due to the presence of the flexible substrate 39. Thus, the number of components in the mobile phone 1 according to the present embodiment is reduced by 1.

In addition, as illustrated in FIG. 5A, to ensure the waterproof performance of the gasket 100x, the gasket 100x preferably has sufficient length in the direction of the thickness TD of the display unit 20x. If the gasket 100x is short, there is a risk that water will flow into the display unit 20x. Therefore, the dimension of the display unit 20x in the thickness direction TD is increased. In addition, since the flexible substrate 39x extends from the edge of the touch panel 30, the dimension of the display unit 20x along a planar direction PD is also increased.

However, in the mobile phone 1 according to the present embodiment, the above-described waterproof structure may be omitted. Therefore, the dimension of the display unit 20 in the direction of the thickness TD may be reduced. In addition, the dimension of the display unit 20 in the planar direction PD may also be reduced.

In addition, as illustrated in FIG. 5A, an area around the contact sections 37x, that is, an area around a connecting section between the touch panel 30x and the flexible substrate 39x, is exposed to the outside. Therefore, there is also a risk that water will flow into a space between a first sensor 32x and a second sensor 34x through a gap between the second sensor 34x and the flexible substrate 39x.

However, in the mobile phone 1 according to the present embodiment, as illustrated in FIG. 2, the flexible substrate 39 and the contact sections 37 are surrounded and thus waterproofed by the first housing 40 and the second housing 70.

Figure 6:
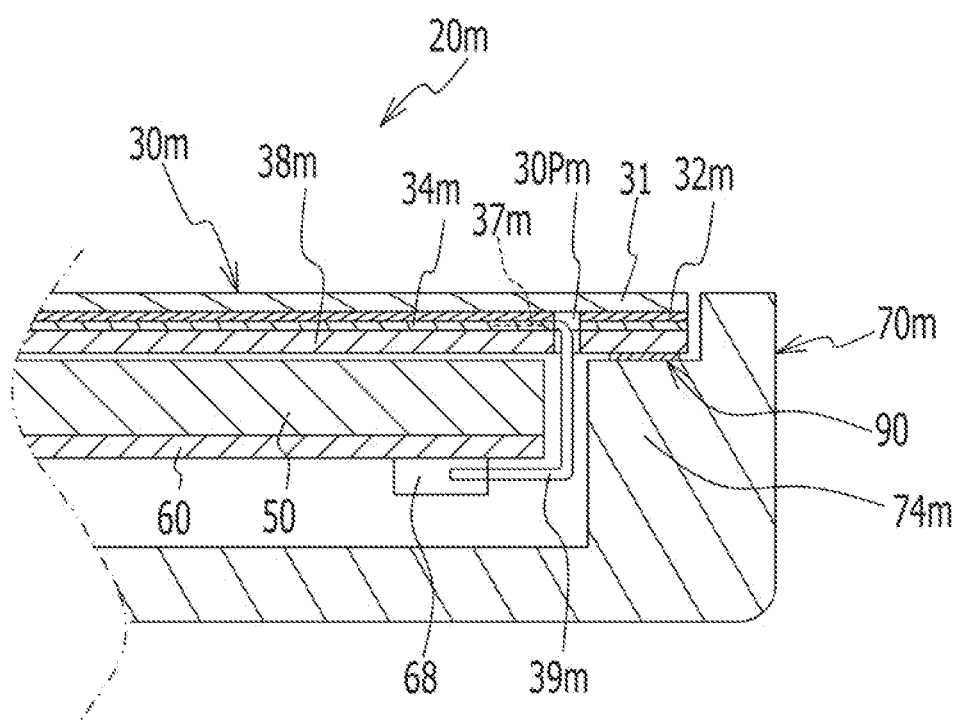
FIG. 6 illustrates a display unit according to a modification.

Next, a display unit according to a modification will be described. FIG. 6 illustrates a display unit 20m according to a modification. A cut section 30Pm is formed by partially cutting a first sensor 32m, a second sensor 34m, and a reinforcing plate 38m. The cut section 30Pm is slit-shaped. Contact sections 37m are located in an ITO film 34b. A flexible substrate 39m extends from a touch panel 30m through the cut section 30Pm, and is connected to a connector 68. Thus, the structure may be such that the contact sections 37m are not exposed. The display unit 20m includes a single housing 70m. The housing 70m includes a frame-shaped peripheral wall section 74m that extends along a peripheral edge of an opening in the housing 70m. The touch panel 30m is bonded to a top surface of the peripheral wall section 74m with a piece of double-sided adhesive tape 90.

Although a preferred embodiment of the present invention is described above, the present invention is not limited to any specific embodiment, and various modifications and alterations are possible within the scope of the present invention as described in the claims.

The portable device is not limited to a mobile phone. For example, the portable device may be an electronic organizer, a personal digital assistant (PDA), an electronic calculator, a clock, a global positioning system (GPS), or a notebook computer.

The touch panel 30 and the control board 60 may be electrically coupled to each other using a component other than the flexible substrate 39. For example, a connector pin may be provided on the control board 60 and be arranged such that the connector pin is in contact with the contact sections 37 of the touch panel 30. Alternatively, a leaf spring may be provided on the control board 60 and be arranged such that the leaf spring is in contact with the contact sections 37.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A portable device comprising:
a housing including a bottom wall section and a frame-shaped peripheral wall section provided on the bottom wall section;
a pressure-sensitive touch panel including a bonding section and a contact section, the bonding section being bonded to the peripheral wall section and the contact section being surrounded by the housing and positioned inside from the bonding section; and
a control board that is electrically connected to the touch panel through the contact section,
wherein the touch panel includes a first conductive film and a second conductive film that face each other with a space provided between the films,
wherein the second conductive film is provided with a cut section at which the first conductive film is partially exposed, and
wherein the contact section is provided on a section of the first conductive film, the section of the first conductive film being exposed at the cut section.

2. A portable device comprising:
a housing including a bottom wall section and a frame-shaped peripheral wall section provided on the bottom wall section;
a pressure-sensitive touch panel including a bonding section and a contact section, the bonding section being bonded to the peripheral wall section and the contact section being surrounded by the housing and positioned inside from the bonding section; and
a control board that is electrically connected to the touch panel through the contact section,
wherein the touch panel includes a first conductive film and a second conductive film that face each other with a space provided between the films,
wherein the first and second conductive films are provided with a cut section, and
wherein the control board is connected to a flexible substrate, the flexible substrate being connected to the contact section and extending through the cut section.

3. The portable device according to claim 1,
wherein each of the first and second conductive films includes a pair of electrode sections, and
wherein the contact section includes a plurality of contact sections, each of which is electrically connected to one of the electrode sections.

4. The portable device according to claim 2,
wherein each of the first and second conductive films includes a pair of electrode sections, and
wherein the contact section includes a plurality of contact sections, each of which is electrically connected to one of the electrode sections.

5. The portable device according to claim 1,
wherein the bonding section is positioned at the touch panel's back side.

6. The portable device according to claim 1, further comprising:
a display panel located on a back side of the touch panel.

7. The portable device according to claim 2,
wherein the bonding section is positioned at the touch panel's back side.

8. The portable device according to claim 2, further comprising:
a display panel located on a back side of the touch panel.

* * * * *